July 14, 1953     W. I. STAAF     2,645,317
SCREW STUD OR FASTENER AND ASSEMBLY UTILIZING SAME
Filed June 29, 1950
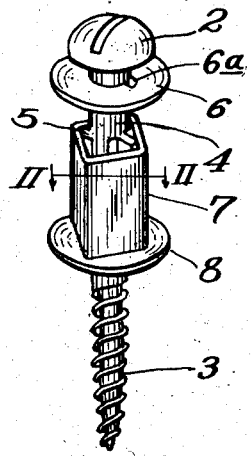
Fig. 1.
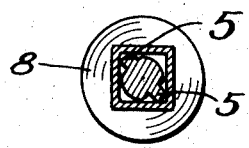
Fig. 2.
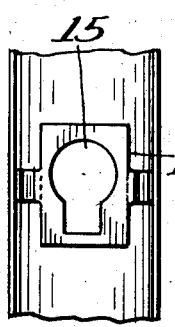 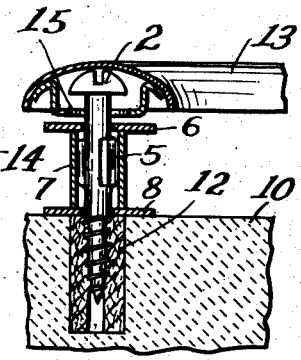 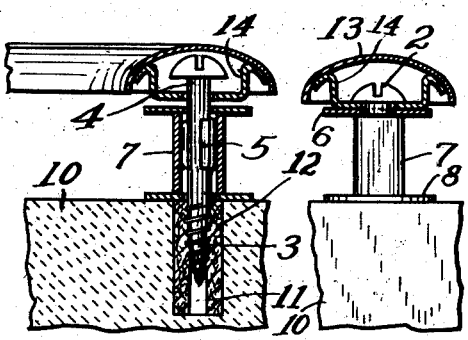
Fig. 3.    Fig. 4.    Fig. 5.    Fig. 6.
Inventor
Werner I. Staaf
By Christy, Pamela, Strickland
Attorneys Patented July 14, 1953

2,645,317

UNITED STATES PATENT OFFICE 2,645,317

SCREW STUD OR FASTENER AND ASSEMBLY UTILIZING SAME

Werner I. Staaf, Rennerdale, Pa.

Application June 29, 1950, Serial No. 171,049

4 Claims. (Cl. 189—88)

This invention is for a screw stud or fastener and an assembly utilizing same, and has for its object to provide a screw stud or fastener which may be used to secure one member in fixed spaced relation to another base or supporting member, and which can be turned to tightly clamp the first member in position after the parts have been assembled.

My invention will be hereinafter illustrated and described with reference to the securing of letters or characters to the face of a display or advertising sign, but it will be understood that this is by way of illustration only, and that the invention may be used in assembling various other parts or devices.

In display or advertising signs of the type referred to, letters or other characters are supported on a base or panel with the letters or characters spaced uniformly out from the plane of such base. Difficulty has heretofore been encountered in providing a stud or supporting means which is entirely concealed from the front of the sign, but which will serve to firmly hold the letter or other character in position. My invention provides a simple, cheap, effective fastener and assembly that may be conveniently used for this and similar purposes.

My invention may be more fully understood by reference to the accompanying drawings, in which:

Fig. 1 is a perspective view of a fastener assembly embodying my invention;

Fig. 2 is a transverse horizontal section in substantially the plane of line II—II of Fig. 1;

Fig. 3 is a bottom plan view of a portion of the member which is to be supported on the base, as for example the under side of a portion of a letter or character of a sign;

Fig. 4 is a vertical section through the fastener and the associated parts of a sign in partly assembled position showing the head of the screw passing through the key hole slot on the under side of the letter or other part of a sign;

Fig. 5 is a view similar to Fig. 4 showing a similar fastener engaged with another part of the same letter or character, but with the parts shifted so that the shank of the screw is engaged in the stem of the key hole slot; and Fig. 6 is a view generally similar to Fig. 5, showing the base in elevation and parts of the fastener assembly in elevation, other parts being shown in transverse vertical section.

Referring to the drawings, the fastener comprises a screw having a head 2, a threaded opposite end portion 3, and an intermediate shank portion 4. The intermediate shank portion 4 is provided with two diametrically opposed ribs or ridges or keys 5 that are integrally formed with the shank 4. In other words, the particular fastener here shown comprises an ordinary wood screw characterized by the presence of the two diametrically opposed fins or keys 5 which are of less length than the length of the shank. The keys 5 therefore terminate below the head 2 so that there is a circular portion of the shank above the keys. Around this circular portion there is a washer 6. This washer has diametrically opposite notches 6a therein which permit it to be slipped into place over the keys 5. Below the washer 6 there is a square sleeve 7, the internal width of which is generally about the same as the diameter of the shank 4, or may be less, and the keys 5 extend into two diagonally opposite corners of the square or other non-circular sleeve 7. Thus the sleeve 7 is slidably but non-rotatably carried on the shank. In other words, there is a spline connection between the sleeve and the screw intermediate the head and the threaded end 3.

The fastener assembly is completed by a second washer 8 which is located under the member 7.

As previously indicated, the fastener has special application in holding one member in spaced relation to a supporting base. For example, it is especially adapted for holding a letter or display character in a sign in spaced relation to the base on which the sign is supported, and such an arrangement will be described. In Figs. 4, 5 and 6, 10 designates a supporting base which may be of any suitable material, including wood, metal, glass, or the like. It is here shown as being provided with openings 11 into which a plug 12 is set, the plug being for cooperation with the end 3 of the screw which is entered into it. The screw fastener assembly is screwed into the base in the usual manner with a screw driver, but the operation is stopped before the head 2 of the screw is down tight against the washer 6. The display character or other member to be supported is designated 13, and is shown as being in the form of a metal strip convexed on its outer surface. It is provided at intervals at which it is to be supported with web members 14 that are secured thereto, these web members having a key slot 15 therein, the key slot having a rounded opening portion of sufficient diameter to permit the head of the screw to pass therethrough while the narrow extension of the key slot is of a width to receive the shank 4 of the screw.

In Figs. 4 and 5, complementary parts of the same sign character or letter are illustrated. In Fig. 4 the head of the screw has just been passed through the large part of the key hole slot 15 at one point of support of the letter, while in Fig. 5 the shank 4 of the screw is in the narrow extension of the key hole slot. It will be understood that a single letter or character may thus be supported at a plurality of points.

After the parts have been brought to the position shown in Fig. 5, a wrench, such as an ordinary open-end wrench, may be applied to the sleeve 7 to turn it. The turning of the sleeve 7 also turns the screw, causing the screw to travel down into the base 10 until eventually the head 2 of the screw presses tightly against the member 14, as shown in Fig. 6, and the letter is firmly clamped between the head of the screw and the washer 6.

Thus the screw can be turned down tight, even though a screw driver cannot be engaged in the kerf of the screw head. The washer 8 provides a surface on which the sleeve 7 can turn. By reason of the splined connection between the sleeve 7 and the screw, the screw can slide lengthwise of the sleeve 7 as it is turned down, and because the ribs or wings 5 extend only part of the length of the shank, adequate relative longitudinal movement is provided for.

While I have shown the screw as being a conventional wood screw, it will be understood that it could be a machine screw, or a lag screw, and that various other modifications and changes may be made within the contemplation of my invention. It will also be understood that while the invention is especially applicable for the provision of signs in relation to a display panel, or back board, or other supporting base, still the invention is applicable to providing a connection between various other assemblies where one part is to be supported in fixed spaced relation to another part, and where provision can be made for embedding in some way the head of the screw in the piece to be supported, as for example, by entering the head of the screw through a key slot or otherwise having it rotatably retained on the member to be supported.

I claim:

1. In a fastener assembly of the class described, a base, a member to be secured to the base in spaced relation thereto, a fastener threaded into the base and having a head with a flat, smooth surface on the under side thereof, said member having a slot therein through which the fastener extends to enclose the head within the member, said fastener having a shank constructed to rotate in the slot in the member with the under side of its head rotatably engaging a smooth surface of the member, a sleeve slidably mounted over the fastener shank between the base and the member, ribs on the shank positioned within the sleeve, said ribs being fitted in the sleeve to fix the sleeve and fastener for rotation together, and the ribs being spaced from the ends of the sleeve to permit sliding movement of the fastener relatively to the sleeve as the fastener is screwed into the base, said sleeve being accessible below the member to a tool for rotating the fastener to screw it into the base.

2. The fastening assembly defined in claim 1 in which a washer is mounted at the top and the bottom of the sleeve between the member and the base to form supporting plates against which the sleeve is clamped when the fastener is screwed into the base.

3. The fastening assembly defined in claim 1 in which the sleeve is polygonal to receive an end wrench to turn and drive the screw into the base to clamp the member under the screw head.

4. The fastening assembly defined in claim 1 in which the member has a key hole slot therein shaped to pass over the screw head with the narrow portion of the slot shaped to closely span the screw shank.

WERNER I. STAAF.

References Cited in the file of this patent

UNITED STATES PATENTS

| Number | Name | Date |
| --- | --- | --- |
| Re. 13,525 | De Puy | Feb. 11, 1913 |
| 1,329,427 | Otto | Feb. 3, 1920 |
| 1,414,979 | Carter | May 2, 1922 |
| 1,896,131 | Williams | Feb. 7, 1933 |
| 2,336,788 | Hotchner | Dec. 14, 1943 |